US010571240B2

(12) United States Patent
Liu et al.

(10) Patent No.: US 10,571,240 B2
(45) Date of Patent: Feb. 25, 2020

(54) WHEEL FLANGE PLANENESS DETECTION DEVICE

(71) Applicant: CITIC Dicastal CO., LTD, Qinhuangdao (CN)

(72) Inventors: Huiying Liu, Qinhuangdao (CN); Weimin Cai, Qinhuangdao (CN)

(73) Assignee: CITIC DICASTAL CO., LTD, Qinhuangdao, Hebei (CN)

( * ) Notice: Subject to any disclaimer, the term of this patent is extended or adjusted under 35 U.S.C. 154(b) by 238 days.

(21) Appl. No.: 15/801,860

(22) Filed: Nov. 2, 2017

(65) Prior Publication Data

US 2019/0025039 A1    Jan. 24, 2019

(30) Foreign Application Priority Data

Jul. 21, 2017  (CN) .......................... 2017 1 0598319

(51) Int. Cl.
| | | |
|---|---|---|
| *G01B 5/28* | (2006.01) | |
| *G01B 5/207* | (2006.01) | |
| *G01B 5/00* | (2006.01) | |
| *G01B 3/22* | (2006.01) | |

(52) U.S. Cl.
CPC ............... *G01B 5/285* (2013.01); *G01B 3/22* (2013.01); *G01B 5/0025* (2013.01); *G01B 5/207* (2013.01)

(58) Field of Classification Search
CPC ...... G01B 5/285; G01B 5/207; G01B 5/0025; G01B 5/20; G01B 5/0004
USPC ............................ 33/203.12, 533, 558, 1 PT
See application file for complete search history.

(56) References Cited

U.S. PATENT DOCUMENTS

| | | | | |
|---|---|---|---|---|
| 4,490,079 A | * | 12/1984 | Trevarrow ............. | B21D 53/26 29/894.323 |
| 4,693,012 A | * | 9/1987 | Cesna ..................... | G01B 5/285 33/533 |
| 5,151,870 A | * | 9/1992 | Beebe ..................... | G01B 5/201 33/203 |
| 5,485,678 A | * | 1/1996 | Wagg ..................... | G01B 7/282 33/543 |
| 6,256,893 B1 | * | 7/2001 | Forborgen ............. | B62D 15/02 33/1 N |

(Continued)

FOREIGN PATENT DOCUMENTS

| | | | | |
|---|---|---|---|---|
| CN | 105547210 A | | 5/2016 | |
| CN | 106840069 A | | 6/2017 | |
| DE | 10337947 B3 | * | 1/2005 | ............... G01B 5/20 |

*Primary Examiner* — Christopher W Fulton
(74) *Attorney, Agent, or Firm* — Calfee, Halter & Griswold LLP

(57) ABSTRACT

Disclosed is a wheel flange planeness detection device, comprising a frame, a lifting cylinder, a lifting platform, guide posts, a support frame, a servo motor, a bearing seat, a shaft, a bearing, a rotating platform, guide rails, a sliding block, a small chain wheel, a large chain wheel, a clamping cylinder, a chain wheel driving motor, a left sliding plate, rotating shafts, rotating wheels, a visual sensor, clamping guide rails, gear rack structures, a right sliding plate, intelligent dial indicators, a support plate, a linear motor and a motor support. The device may monitor the state of flange planeness in an automatic production line in real time; when the flange planeness is out of tolerance, the device may immediately give an alarm, and the technologist adjusts the machining process in time after receiving the alarm, thereby avoiding a large batch of rejects.

1 Claim, 3 Drawing Sheets

(56) References Cited

U.S. PATENT DOCUMENTS

| | | | |
|---|---|---|---|
| 6,408,528 B1* | 6/2002 | Diez | G01M 1/02 |
| | | | 33/203 |
| 6,657,711 B1* | 12/2003 | Kitagawa | G01B 11/2755 |
| | | | 280/86.758 |
| 6,810,593 B2* | 11/2004 | Kobayashi | F16F 15/324 |
| | | | 33/203 |
| 7,343,690 B2* | 3/2008 | Sato | G01B 5/207 |
| | | | 33/533 |
| 8,732,967 B2* | 5/2014 | Hiller | G01D 5/248 |
| | | | 33/1 PT |
| 2008/0123107 A1* | 5/2008 | Sotgiu | B60C 25/0554 |
| | | | 356/601 |
| 2009/0293603 A1* | 12/2009 | Douglas | G01B 21/12 |
| | | | 73/146 |
| 2017/0211928 A1* | 7/2017 | Chen | B60B 3/10 |

* cited by examiner

WHEEL FLANGE PLANENESS DETECTION DEVICE

CROSS-REFERENCE TO RELATED APPLICATIONS

This application claims priority to Chinese Patent Application No. 20171059 8319.2 filed on Jul. 21, 2017, which is hereby incorporated by reference in its entirety.

TECHNICAL FIELD

The present application relates to the field of detection technology, specifically to a wheel flange planeness and sinking detection device.

BACKGROUND ART

Flange planeness involves in assembly of a wheel and is a key characteristic of the wheel, and the essentials of control lie in that the flange planeness value is not out of tolerance and the flange plane is sunken. At present, the flange planeness value is mainly measured first, medium and tail pieces via a three-coordinate measurement system, so that 100% detection in streamline operation cannot be realized; and flange plane sinking is mainly inspected randomly and manually via a knife straight edge, so that the efficiency is low, misjudgment is also caused, and high-efficiency continuous 100% detection in automation cannot be realized. In the absence of 100% detection, the flange planeness value out of tolerance or the flange plane protruding cannot be discovered timely, and batches of rejects are often caused.

SUMMARY OF THE INVENTION

The present application provides a detection device for monitoring the state of flange planeness in an automatic production line in real time.

In order to fulfill the above aim, the present application adopts the following technical solution: a wheel flange planeness detection device comprises a frame, a lifting cylinder, a lifting platform, guide posts, a support frame, a servo motor, a bearing seat, a shaft, a bearing, a rotating platform, guide rails, a sliding block, a small chain wheel, a large chain wheel, a clamping cylinder, a chain wheel driving motor, a left sliding plate, rotating shafts, rotating wheels, a visual sensor, clamping guide rails, gear rack structures, a right sliding plate, intelligent dial indicators, a support plate, a linear motor and a motor support.

The support plate is fixed on the frame, the clamping guide rails are mounted on the support plate, the left sliding plate and the right sliding plate are respectively mounted on the clamping guide rails, the gear rack structure is connected with the left sliding plate and the right sliding plate, the clamping cylinder is connected with the left sliding plate, two rotating wheels are mounted on the left sliding plate, the other two rotating wheels are mounted on the right sliding plate, the chain wheel driving motor is fixedly mounted on the left sliding plate, the output end of the chain wheel driving motor is connected with the small chain wheel, the large chain wheel is mounted on the rotating shaft, and the small chain wheel is connected with the large chain wheel via a chain; when the clamping cylinder drives the left sliding plate to move, the right sliding plate moves synchronously, and a wheel can be clamped; and when the chain wheel driving motor is started, the rotating wheels can be driven to rotate by chain drive, so that the clamped wheel can also rotate at a low speed.

The visual sensor is mounted above the frame, and when the wheel rotates at a low speed, the visual sensor can recognize the position of a valve hole and then sends a signal to the chain wheel driving motor, so that the wheel stops rotating.

The four guide posts are symmetrically mounted at the lower part of the frame, the lifting cylinder is fixed in the center of the bottom of the frame, the output end of the lifting cylinder is fixedly connected with the lifting platform, and the lifting cylinder controls ascending and descending of the lifting platform under the guiding effect of the guide posts.

The support frame is fixed on the lifting platform, the servo motor is mounted on the support frame, and the output end of the servo motor is connected with the rotating platform to control rotation of the rotating platform. Both the two guide rails and the motor support are mounted on the rotating platform, the sliding block is mounted on the guide rails, the linear motor is mounted on the motor support, and the output end of the linear motor is connected with the sliding block to control horizontal motion of the sliding block. The sliding block is provided with a sliding chute, the three intelligent dial indicators are mounted in the sliding chute, the extension heights of hands of the intelligent dial indicators are consistent, the distances between the intelligent dial indicators can be adjusted by horizontally sliding the intelligent dial indicators, and the intelligent dial indicators can be fixed and locked via set screws after the distances are adjusted. The distances between the three intelligent dial indicators are adjusted to match a flange face of a detected wheel, wherein the hand of the left intelligent dial indicator measures the outer ring of the flange face, the hand of the intelligent middle dial indicator measures the middle ring of the flange face, and the hand of the intelligent right dial indicator measures the inner ring of the flange face. When the diameter of a flange is increased or reduced, the positions of the intelligent dial indicators can be adjusted by controlling horizontal motion of the sliding block via the linear motor. Therefore, the device has certain flexibility, and can detect wheels having different flange diameters and difference flange face widths.

The working process of this patent is as follows: firstly, the positions of the intelligent dial indicators are adjusted according to the flange diameter and flange face width of a wheel, wherein the hand of the left intelligent dial indicator measures the outer ring of the flange face, the hand of the middle intelligent dial indicator measures the middle ring of the flange face, and the hand of the right intelligent dial indicator measures the inner ring of the flange face; the wheel arrives above the device, the clamping cylinder is started, and the left sliding plate and the right sliding plate move synchronously under the action of the gear rack structures to clamp the wheel; then the chain wheel driving motor is started to drive the wheel to rotate at a low speed, and the visual sensor begins seeking the position of a valve hole and feeds back a signal to the chain wheel driving motor after finding the valve hole, so that the motor stops rotating, and the wheel stops rotating as well; next, the servo motor is started to drive the rotating platform to rotate a certain angle, and the certain angle can be calculated according to the position of the valve hole, so that the hands of the intelligent dial indicators avoid flange drainage channels and bolt holes; after the rotating angle of the rotating platform is adjusted, the lifting cylinder is started to drive the rotating platform to ascend, the hands of the intelligent dial indicators contact the flange face and are in a compressed state via the preset ascending height, and the values measured by the intelligent dial indicators are automatically acquired and analyzed by a computer. After a group of data is detected, the intelligent dial indicators descend, the rotating platform rotates a certain angle again, the certain angle is calculated according to the position of the valve hole, another group of data is obtained by second detection while the flange drainage channels and the bolt holes are avoided, and the number of detections is preferably more than or equal to 3.

The criteria for judging the flange planeness qualified include: (1) in each group of detection data, the value of the intelligent dial indicator for measuring the outer ring is greater than the value of the intelligent dial indicator for measuring the middle ring and the value of the intelligent dial indicator for measuring the middle ring is greater than the value of the intelligent dial indicator for measuring the inner ring, wherein this criterion ensures the flange plane sunken; and (2) the computer automatically calculates the flange planeness of the wheel via all the acquired data and the preset compression value, and compares this value with the value required by a drawing to judge whether the flange planeness is qualified. When the two criteria are met, the flange planeness is qualified, otherwise, the flange planeness is not qualified, and the device gives an alarm.

The present application may monitor the state of flange planeness in the automatic production line in real time; when the flange planeness is out of tolerance, the device may immediately give an alarm, and the technologist adjusts the machining process in time after receiving the alarm, thereby avoiding a large batch of rejects. The device is simple in structure, strong in practicability and high in efficiency, and may be used for 100% detection of the flange planeness in the automatic continuous production.

Figure 1:
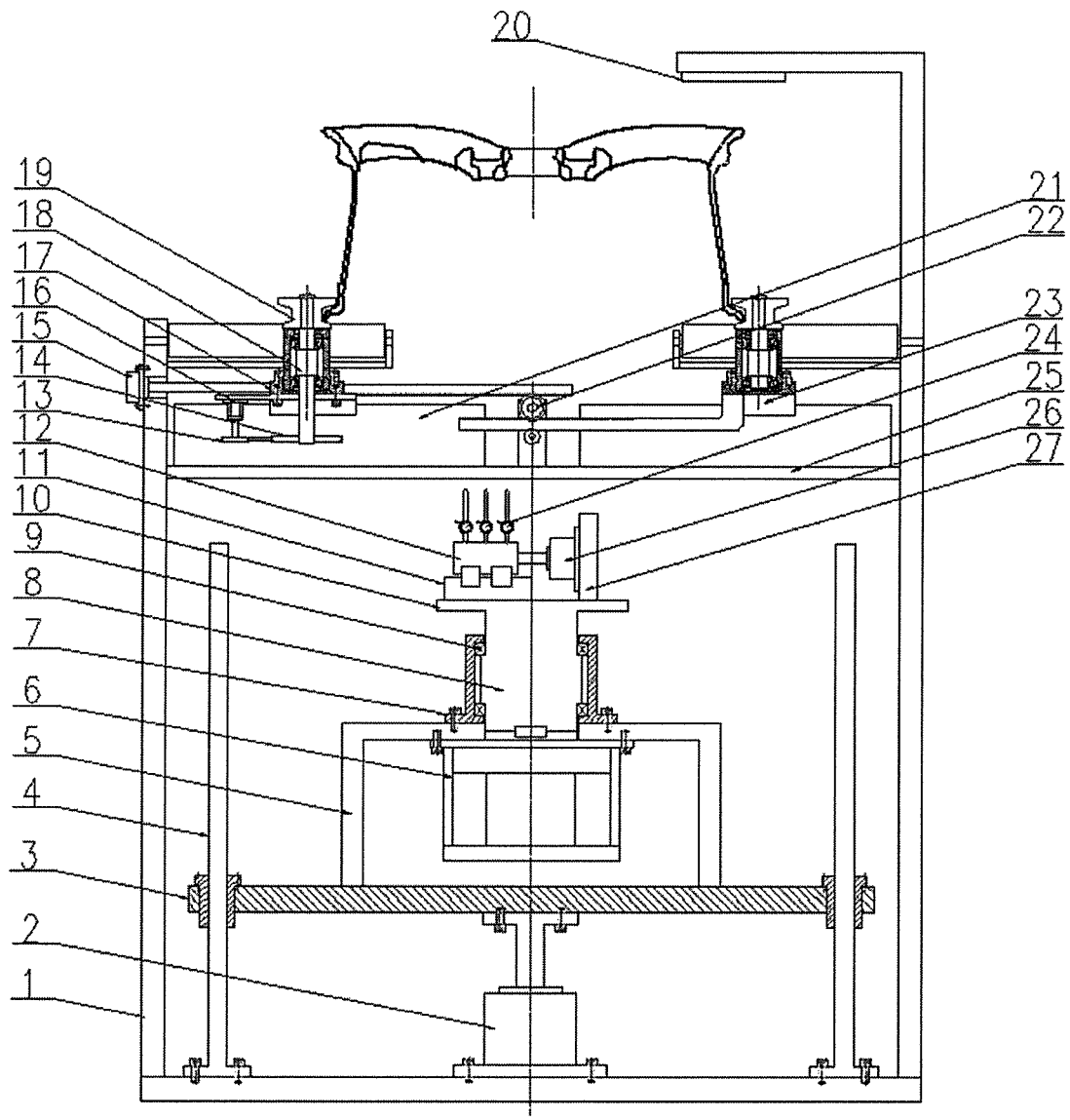
FIG. 1 is a front view of a wheel flange planeness detection device of the present application.
Figure 2:
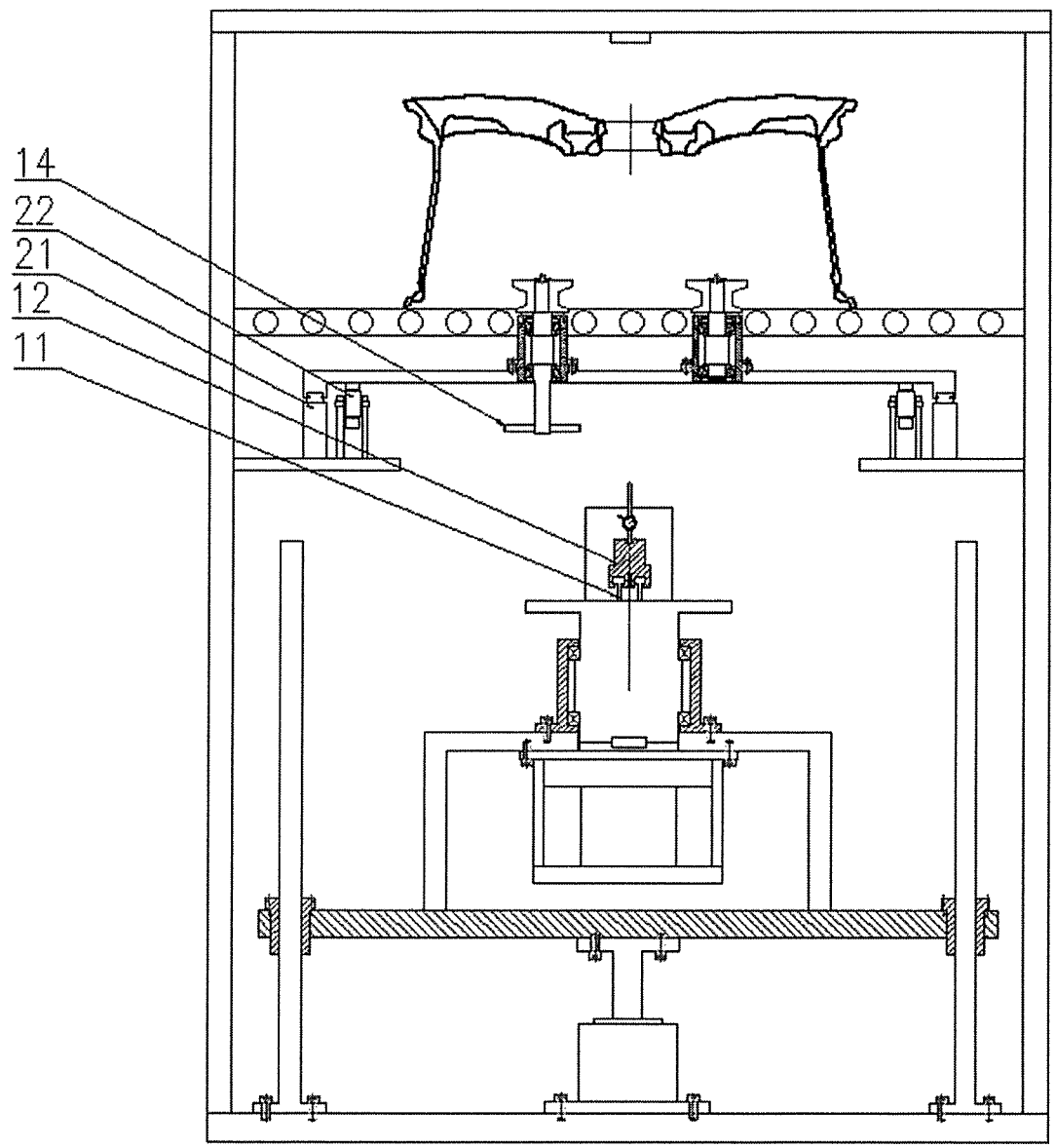
FIG. 2 is a left view of the wheel flange planeness detection device of the present application.
Figure 3:
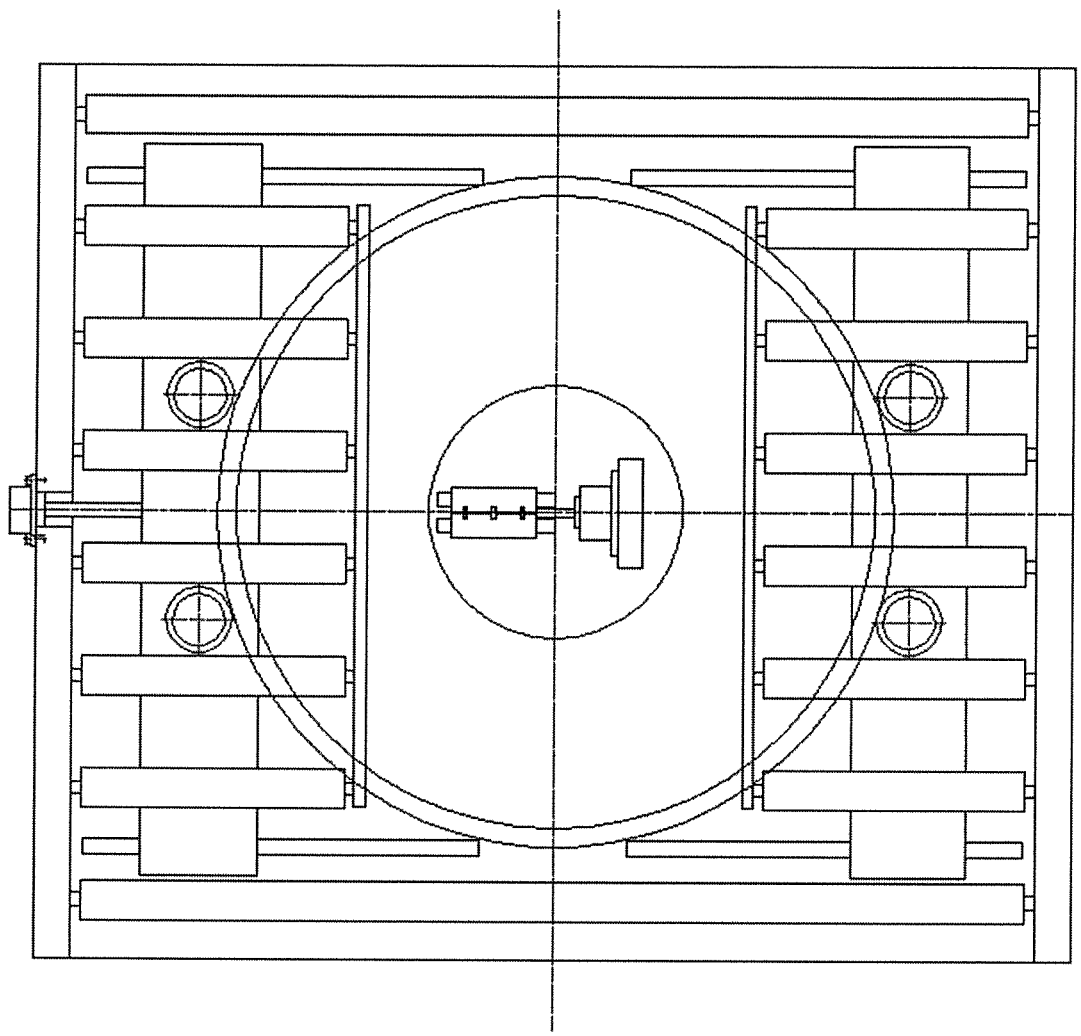
FIG. 3 is a top view of the wheel flange planeness detection device of the present application.

In figures: 1—frame, 2—lifting cylinder, 3—lifting platform, 4—guide post, 5—support frame, 6—servo motor, 7—bearing seat, 8—shaft, 9—bearing, 10—rotating platform, 11—guide rail, 12—sliding block, 13—small chain wheel, 14—large chain wheel, 15—clamping cylinder, 16—chain wheel driving motor, 17—left sliding plate, 18—rotating shaft, 19—rotating wheel, 20—visual sensor, 21—clamping guide rail, 22—gear rack structure, 23—right sliding plate, 24—intelligent dial indicator, 25—support plate, 26—linear motor, 27—motor support.

DETAILED DESCRIPTION OF THE INVENTION

Specific details and working conditions of a device provided by the present application will be given below in combination with the accompanying drawings.

A wheel flange planeness detection device comprises a frame 1, a lifting cylinder 2, a lifting platform 3, guide posts 4, a support frame 5, a servo motor 6, a bearing seat 7, a shaft 8, a bearing 9, a rotating platform 10, guide rails 11, a sliding block 12, a small chain wheel 13, a large chain wheel 14, a clamping cylinder 15, a chain wheel driving motor 16, a left sliding plate 17, rotating shafts 18, rotating wheels 19, a visual sensor 20, clamping guide rails 21, gear rack structures 22, a right sliding plate 23, intelligent dial indicators 24, a support plate 25, a linear motor 26 and a motor support 27.

The support plate 25 is fixed on the frame 1, the clamping guide rails 21 are mounted on the support plate 25, the left sliding plate 17 and the right sliding plate 23 are respectively mounted on the clamping guide rails 21, the gear rack structure 22 is connected with the left sliding plate 17 and the right sliding plate 23, the clamping cylinder 15 is connected with the left sliding plate 17, two rotating wheels 19 are mounted on the left sliding plate 17, the other two rotating wheels 19 are mounted on the right sliding plate 23, the chain wheel driving motor 16 is fixedly mounted on the left sliding plate 17, the output end of the chain wheel driving motor 16 is connected with the small chain wheel 13, the large chain wheel 14 is mounted on the rotating shaft 18, and the small chain wheel 13 is connected with the large chain wheel 14 via a chain; when the clamping cylinder 15 drives the left sliding plate 17 to move, the right sliding plate 23 moves synchronously, and a wheel may be clamped; and when the chain wheel driving motor 16 is started, the rotating wheels 19 may be driven to rotate by chain drive, so that the clamped wheel may also rotate at a low speed.

The visual sensor 20 is mounted above the frame 1, and when the wheel rotates at a low speed, the visual sensor 20 may recognize the position of a valve hole and then sends a signal to the chain wheel driving motor 16, so that the wheel stops rotating.

The four guide posts 4 are symmetrically mounted at the lower part of the frame 1, the lifting cylinder 2 is fixed in the center of the bottom of the frame 1, the output end of the lifting cylinder 2 is fixedly connected with the lifting platform 3, and the lifting cylinder 2 controls ascending and descending of the lifting platform 3 under the guiding effect of the guide posts 4.

The support frame 5 is fixed on the lifting platform 3, the servo motor 6 is mounted on the support frame 5, and the output end of the servo motor 6 is connected with the rotating platform 10 to control rotation of the rotating platform 10. Both the two guide rails 11 and the motor support 27 are mounted on the rotating platform 10, the sliding block 12 is mounted on the guide rails 11, the linear motor 26 is mounted on the motor support 27, and the output end of the linear motor 26 is connected with the sliding block 12 to control horizontal motion of the sliding block 12. The sliding block 12 is provided with a sliding chute, the three intelligent dial indicators 24 are mounted in the sliding chute, the extension heights of hands of the intelligent dial indicators 24 are consistent, the distances between the intelligent dial indicators 24 can be adjusted by horizontally sliding the intelligent dial indicators 24, and the intelligent dial indicators 24 can be fixed and locked via set screws after the distances are adjusted. The distances between the three intelligent dial indicators 24 are adjusted to match a flange face of a detected wheel, wherein the hand of the left intelligent dial indicator measures the outer ring of the flange face, the hand of the middle intelligent dial indicator measures the middle ring of the flange face, and the hand of the right intelligent dial indicator measures the inner ring of the flange face. When the diameter of a flange is increased or reduced, the positions of the intelligent dial indicators 24 can be adjusted by controlling horizontal motion of the sliding block 12 via the linear motor 26. Therefore, the device has certain flexibility, and can detect wheels having different flange diameters and difference flange face widths.

The working process of this application is as follows: firstly, the positions of the intelligent dial indicators 24 are adjusted according to the flange diameter and flange face width of a wheel, wherein the hand of the left intelligent dial indicator measures the outer ring of the flange face, the hand of the middle intelligent dial indicator measures the middle ring of the flange face, and the hand of the right intelligent dial indicator measures the inner ring of the flange face; the wheel arrives above the device, the clamping cylinder 15 is started, and the left sliding plate 17 and the right sliding plate 23 move synchronously under the action of the gear rack structures 22 to clamp the wheel; then the chain wheel driving motor 16 is started to drive the wheel to rotate at a low speed, and the visual sensor 20 begins seeking the position of a valve hole and feeds back a signal to the chain wheel driving motor 16 after finding the valve hole, so that the motor stops rotating, and the wheel stops rotating as well; next, the servo motor 6 is started to drive the rotating platform 10 to rotate a certain angle, and the certain angle can be calculated according to the position of the valve hole, so that the hands of the intelligent dial indicators 24 avoid flange drainage channels and bolt holes; after the rotating angle of the rotating platform 10 is adjusted, the lifting cylinder 2 is started to drive the rotating platform 10 to ascend, the hands of the intelligent dial indicators 24 contact the flange face and are in a compressed state via the preset ascending height, and the values measured by the intelligent dial indicators 24 are automatically acquired and analyzed by a computer. After a group of data is detected, the intelligent dial indicators 24 descend, the rotating platform 10 rotates a certain angle again, the certain angle is calculated according to the position of the valve hole, another group of data is obtained by second detection while the flange drainage channels and the bolt holes are avoided, and the number of detections is preferably more than or equal to 3.

The criteria for judging the flange planeness qualified include: (1) in each group of detection data, the value of the intelligent dial indicator 24 for measuring the outer ring is greater than the value of the intelligent dial indicator 24 for measuring the middle ring, and the value of the intelligent dial indicator 24 for measuring the middle ring is greater than the value of the intelligent dial indicator 24 for measuring the inner ring, wherein this criterion ensures the flange plane sunken; and (2) the computer automatically calculates the flange planeness of the wheel via all the acquired data and the preset compression value, and compares this value with the value required by a drawing to judge whether the flange planeness is qualified. When the two criteria are met, the flange planeness is qualified, otherwise, the flange planeness is not qualified, and the device gives an alarm.

The present application may monitor the state of flange planeness in the automatic production line in real time; when the flange planeness is out of tolerance, the device may immediately give an alarm, and the technologist adjusts the machining process in time after receiving the alarm, thereby avoiding a large batch of rejects. The device is simple in structure, strong in practicability and high in efficiency, and may be used for 100% detection of the flange planeness in the automatic continuous production.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings.

The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A wheel flange planeness detection device, comprising a frame, a lifting cylinder, a lifting platform, guide posts, a support frame, a servo motor, a bearing seat, a shaft, a bearing, a rotating platform, guide rails, a sliding block, a small chain wheel, a large chain wheel, a clamping cylinder, a chain wheel driving motor, a left sliding plate, rotating shafts, rotating wheels, a visual sensor, clamping guide rails, gear rack structures, a right sliding plate, intelligent dial indicators, a support plate, a linear motor and a motor support, wherein the visual sensor is mounted above the frame, and when the wheel rotates at a low speed, the visual sensor is configured to recognize the position of a valve hole and then sends a signal to the chain wheel driving motor, so that the wheel stops rotating;

the support plate is fixed on the frame, the clamping guide rails are mounted on the support plate, the left sliding plate and the right sliding plate are respectively mounted on the clamping guide rails, the gear rack structure is connected with the left sliding plate and the right sliding plate, the clamping cylinder is connected with the left sliding plate, two rotating wheels are mounted on the left sliding plate, the other two rotating wheels are mounted on the right sliding plate, the chain wheel driving motor is fixedly mounted on the left sliding plate, the output end of the chain wheel driving motor is connected with the small chain wheel, the large chain wheel is mounted on the rotating shaft, and the small chain wheel is connected with the large chain wheel via a chain; when the clamping cylinder drives the left sliding plate to move, the right sliding plate moves synchronously, and a wheel can be clamped; and when the chain wheel driving motor is started, the rotating wheels can be driven to rotate by chain drive, so that the clamped wheel can also rotate at a low speed;

the four guide posts are symmetrically mounted at the lower part of the frame, the lifting cylinder is fixed in the center of the bottom of the frame, the output end of the lifting cylinder is fixedly connected with the lifting platform, and the lifting cylinder controls ascending and descending of the lifting platform under the guiding effect of the guide posts; and the support frame is fixed on the lifting platform, the servo motor is mounted on the support frame, and an output end of the servo motor is connected with the rotating platform to control rotation of the rotating platform; both the two guide rails and the motor support are mounted on the rotating platform, the sliding block is mounted on the guide rails, the linear motor is mounted on the motor support, and an output end of the linear motor is connected with the sliding block to control horizontal motion of the sliding block; the sliding block is provided with a sliding chute, the three intelligent dial indicators are mounted in the sliding chute, the extension heights of hands of the intelligent dial indicators are consistent, the distances between the intelligent dial indicators are configured to be adjusted by horizontally sliding the intelligent dial indicators, and the intelligent dial indicators are configured to be fixed and locked via set screws after the distances are adjusted; and when the diameter of a flange is increased or reduced, the position of the intelligent dial indicators are configured to be adjusted by controlling horizontal motion of the sliding block via the linear motor.

\* \* \* \* \*